United States Patent
Triteyaprasert et al.

(10) Patent No.: US 7,493,033 B2
(45) Date of Patent: Feb. 17, 2009

(54) IMAGE PICKUP DEVICE AND METHOD, AND PROGRAM

(75) Inventors: Soroj Triteyaprasert, Tokyo (JP); Hidenori Kushida, Tokyo (JP); Tatsuya Ibuka, Aichi (JP)

(73) Assignee: Sony Corporation, Tokyo (JP)

( * ) Notice: Subject to any disclaimer, the term of this patent is extended or adjusted under 35 U.S.C. 154(b) by 472 days.

(21) Appl. No.: 11/318,693

(22) Filed: Dec. 27, 2005

(65) Prior Publication Data
US 2006/0140608 A1 Jun. 29, 2006

(30) Foreign Application Priority Data
Dec. 28, 2004 (JP) ............................ P2004-381236

(51) Int. Cl.
*G03B 17/00* (2006.01)
(52) U.S. Cl. .......................................... 396/79; 396/85
(58) Field of Classification Search ................. 396/72, 396/79–83, 85–88, 131, 137; 348/240.99, 348/340.3, 345, 347
See application file for complete search history.

(56) References Cited

U.S. PATENT DOCUMENTS 6,714,731 B2 *  3/2004  Ogg et al. ...................... 396/81

FOREIGN PATENT DOCUMENTS

JP         9 152551        6/1997
JP         2000 147368     5/2000

* cited by examiner

*Primary Examiner*—Rodney E Fuller
(74) *Attorney, Agent, or Firm*—Frommer Lawrence & Haug LLP; William S. Frommer

(57) ABSTRACT

An image pickup device having an auto-focus feature of adjusting a focus lens to focus on a picked-up image of an object, a zoom feature of changing a focus distance, and a telemacro-mode shooting feature of obtaining generally-difficult close-range focus by fixing the focus distance to a telescope end. The image pickup device switches between an auto-focus mode and a manual mode. Likewise the device switches between a telemacro mode and a normal mode. The zoom lens is driven to adjust the focus distance and the focus lens is driven to adjust the shooting distance. A controller drives the zoom lens drive unit to move the zoom lens to a telescope end when the normal mode is switched to the telemacro mode; and drives the focus lens drive unit to move the focus lens to an object-closest end when in the telemacro mode.

10 Claims, 12 Drawing Sheets

IMAGE PICKUP DEVICE AND METHOD, AND PROGRAM

CROSS REFERENCES TO RELATED APPLICATIONS

The present invention contains subject matter related to Japanese Patent Application JP 2004-381236 filed in the Japanese Patent Office on Dec. 28, 2004, the entire contents of which being incorporated herein by reference.

BACKGROUND OF THE INVENTION

The present invention relates to image pickup devices, methods, and programs and, more specifically, to an image pickup device, method, and program with which a focus lens is stopped from snapping into focus on distant background by moving the lens to an object-closest end possible for a macro shooting mode at the time of mode transition from general shooting to macro shooting with an auto-focus feature activated.

DESCRIPTION OF THE RELATED ART

There are many types of digital still cameras, digital video cameras, and others currently on the market having the features of auto-focus, zoom, and macro shooting. Such cameras are hereinafter simply referred to as digital cameras.

The auto-focus feature allows achieving automatic focus on objects. To obtain proper focus on an object with such an auto-focus feature, a focus lens is driven to successively pick up an image including the object, and from the resulting images, high frequency components equivalent to object contours are extracted so that the sharpness of the images is detected. Driving of the focus lens is then stopped at a position where the detected sharpness shows the highest or maximum value so that proper focus can be obtained. If the focus lens is driven in response to user operation to obtain proper focus, such a feature is referred to as manual focus feature.

The zoom feature allows to arbitrarily adjust the angle of view within a range from wide to telescope for picking-up images by successively changing a focus distance in accordance with user operation. In the below, the end on the telescope side of the zoom feature is referred to as tele end, and the end on the wide side as wide end.

The macro shooting feature can achieve close-range focus that has not been possible with any of normal shooting modes. Hereinafter, such normal shooting modes are referred to as normal modes, and the state in which the macro shooting feature is activated is referred to as macro mode. When a group of lenses used in a digital camera is of the inner focus system, a zoom lens is fixed at a tele end, and the active range for a focus lens is expanded toward the side closer to the object than with the normal mode so that the macro shooting feature can be implemented. In digital cameras using the optical system of inner focus, the macro shooting feature is specifically referred to as telemacro feature. The state in which the telemacro feature is activated is referred to as telemacro mode.

As to the active range for the focus lens in the normal mode, the farthest side is referred to as infinity, and the closest side is referred to as normal object-closer end. As to the active range for the focus lens in the macro mode, the closest side is referred to as macro object-closer end.

The issue here is that the auto-focus feature causes problems due to "background draw-in" during pickup of moving images. This "background draw-in" means that focusing is achieved on background or user-unintended objects when the background is high in contrast in a shooting scene. During pickup of moving images, once achieving focus, the auto-focus feature tends to follow the focused object. As a result, the user's originally-intended object locating at the front near to the user will not be focused.

As such, when mode transition is made to macro from normal when a distant object is focused with the activated auto-focus feature, an object requiring macro-mode focus in a close range is not properly focused. Assuming here is a case that an acquired image has the relation of FIG. 1 between the focus lens position and the sharpness, i.e., when normal mode focus is achieved at the focus lens position with maximum value of m1, which is equivalent to a distant object. In such a case, even if mode transition is made to macro, macro mode focus cannot be achieved at the focus lens position with the maximum value of m2, which is equivalent to an object in a close range.

As a measure for such background draw-in, Patent Document 1 (JP-A-2000-147368) is proposing a technology of reactivating the auto-focus feature, for example. That is, when mode transition is made from normal to macro, the auto-focus feature is deactivated, and the focus lens position is moved to macro object-closer end. After position movement as such, the auto-focus feature is activated again.

SUMMARY OF THE INVENTION

The problem with the technology of Patent Document 1 is unfavorable image outputs in the course of moving the focus lens position to the macro object-closer end in response to mode transition from normal to macro. Such unfavorable images include, for example, images with lens dirt or dust, focused-in-optical-system images, or shooting-distance-varying images. No solution for such a problem is yet offered.

Another problem with the technology of Patent Document 1 is the time for refocusing. If an interruption occurs to mode transition to macro, or if a feature change is made to the manual focus before the focus lens position is completely moved to the macro object-closer end, it takes time to achieve focus again.

It is thus considered desirable to prevent background draw-in when mode transition is made from normal to macro with an auto-focus feature activated, and suppress output of unfavorable images during mode transition to macro.

A first aspect of the present invention is directed to an image pickup device that includes: a focus mode switching unit for switching between an auto-focus mode in which an auto-focus feature is activated, and a manual mode in which the auto-focus feature is deactivated; a shooting mode switching unit for switching between a telemacro mode in which a telemacro shooting feature is activated, and a normal mode in which the telemacro shooting feature is deactivated; a zoom lens drive unit for driving a zoom lens to adjust a focus distance; a focus lens drive unit for driving a focus lens to adjust a shooting distance; and a control unit for exercising control over, when the normal mode is switched to the telemacro mode, the zoom lens drive unit to move a zoom lens position to a telescope end, and exercising control over the focus lens drive unit to move a focus lens position to an object-closest end in the telemacro mode.

The control unit can move the zoom lens position to the telescope end in a positive direction being from a wide side to a telescope side for the zoom lens, and move the focus lens position with a monotonous increase to the object-closest end in the telemacro mode in another positive direction being from a far side to a close side for the focus lens.

The control unit can move the zoom lens position to the telescope end, and move the focus lens position to the object-closest end in the telemacro mode to allow a combination point of the zoom lens position and the focus lens position to move along a locus that passes an object-closest end of achieving focus with the zoom lens at the wide end.

A position space containing a combination point of the zoom lens position and the focus lens position in the normal mode is divided into first and second ranges along a locus that passes an object-closest end of achieving focus with the zoom lens at the telescope end in the normal mode. When the first range contains a combination point of an original zoom lens position and an original focus lens position, the control unit can move the zoom lens position to the telescope end in a positive direction being from the wide side to the telescope side for the zoom lens by way of the highest point of the locus, and move the shooting distance for the focus lens with a monotonous increase to the object-closest end in the telemacro mode in another positive direction being from the far side to the close side for the focus lens. When the second range contains the combination point of the original zoom lens position and the original focus lens position, the control unit can move the combination point of the zoom lens position and the focus lens position to the object-closest end in the telemacro mode after moving the combination point onto the locus to be up to the highest point therealong.

A position space containing a combination point of the zoom lens position and the focus lens position in the normal mode is divided into first and second ranges along a locus that passes an object-closest end of achieving focus with the zoom lens at the telescope end in the normal mode. When the first range contains a combination point of an original zoom lens position and an original focus lens position, the control unit can move the zoom lens position to the telescope end in a positive direction being from the wide side to the telescope side for the zoom lens, and move the shooting distance for the focus lens with a monotonous increase to the object-closest end in the telemacro mode in another positive direction being from the far side to the close side for the focus lens. When the second range contains the combination point of the original zoom lens position and the original focus lens position, the control unit can move the zoom lens position to the telescope end in the positive direction by way of the highest point of the locus, and move the shooting distance for the focus lens with a monotonous increase to the object-closest end in the telemacro mode.

When the telemacro mode is switched to the normal mode during mode transition to telemacro, the control unit can stop the zoom lens from moving, and make the focus lens focus with an original shooting distance of before the mode transition to telemacro.

When the auto-focus mode is switched to the manual focus mode during mode transition to telemacro, the control unit can move the focus lens position to a position corresponding to the shooting distance of before the mode transition to telemacro.

A second aspect of the present invention is directed to an image pickup method that includes a control step of moving the zoom lens position to the telescope end through control over the zoom lens drive unit when the normal mode is switched to the telemacro mode, and moving the focus lens position to the object-closet end in the telemacro mode through control over the focus lens drive unit.

A third aspect of the present invention is directed to a program that includes, for process execution by a computer, a control step of moving the zoom lens position to the telescope end through control over the zoom lens drive unit when the normal mode is switched to the telemacro mode, and moving the focus lens position to the object-closet end in the telemacro mode through control over the focus lens drive unit.

In the present invention, when the normal mode is switched to the telemacro mode, the zoom lens position is moved to the telescope end, and the focus lens position is moved to the object-closest end in the telemacro mode.

According to the present invention, it becomes possible to prevent background draw-in when mode transition is made from normal to macro with an auto-focus feature activated, and suppress output of unfavorable images during mode transition to macro.

DETAILED DESCRIPTION OF THE INVENTION

Prior to describing an embodiment of the present invention, exemplified below is a correlation among claimed components and specific examples in the embodiment. This is aimed to prove that specific examples provided for the purpose of supporting the description of claims are described in the embodiment of the present invention. Therefore, even if there are any specific examples not found here for the components described in the embodiment of the present invention, it does not mean that the specific examples are not correlated to the components. On the other hand, even if there are specific examples found here for the components, it does not mean that the specific examples are not correlated to components except for the components.

Moreover, the description herein does not mean that aspects corresponding to the specific examples found in the embodiment of the present invention are completely claimed. In other words, this description is not denying the presence of aspects not claimed but corresponding to the specific examples found in the embodiment of the present invention, i.e., the presence of inventions for future divisional application or amendment addition.

Figure 1:
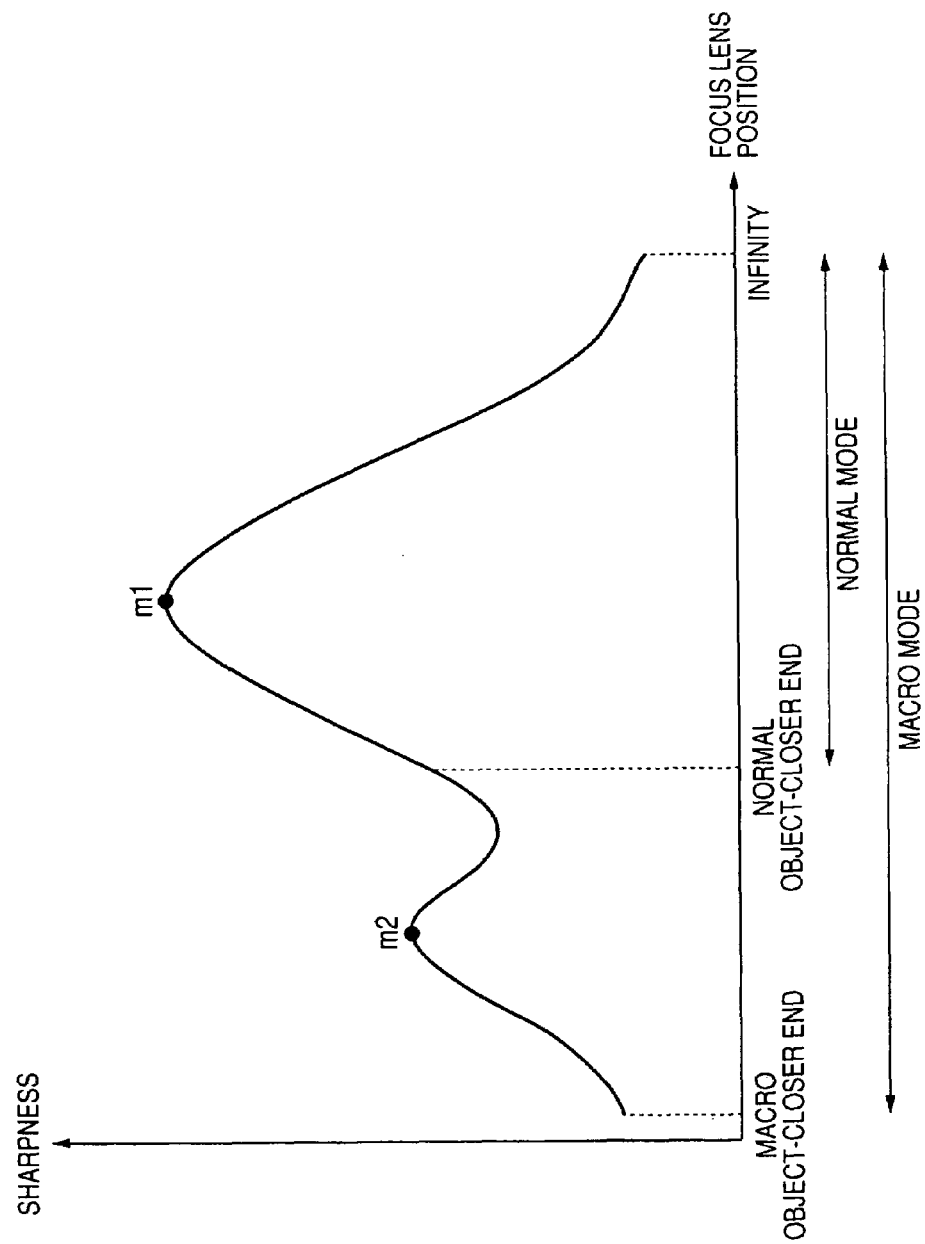
FIG. 1 is a diagram illustrating background draw-in in an auto-focus mode.
Figure 2:
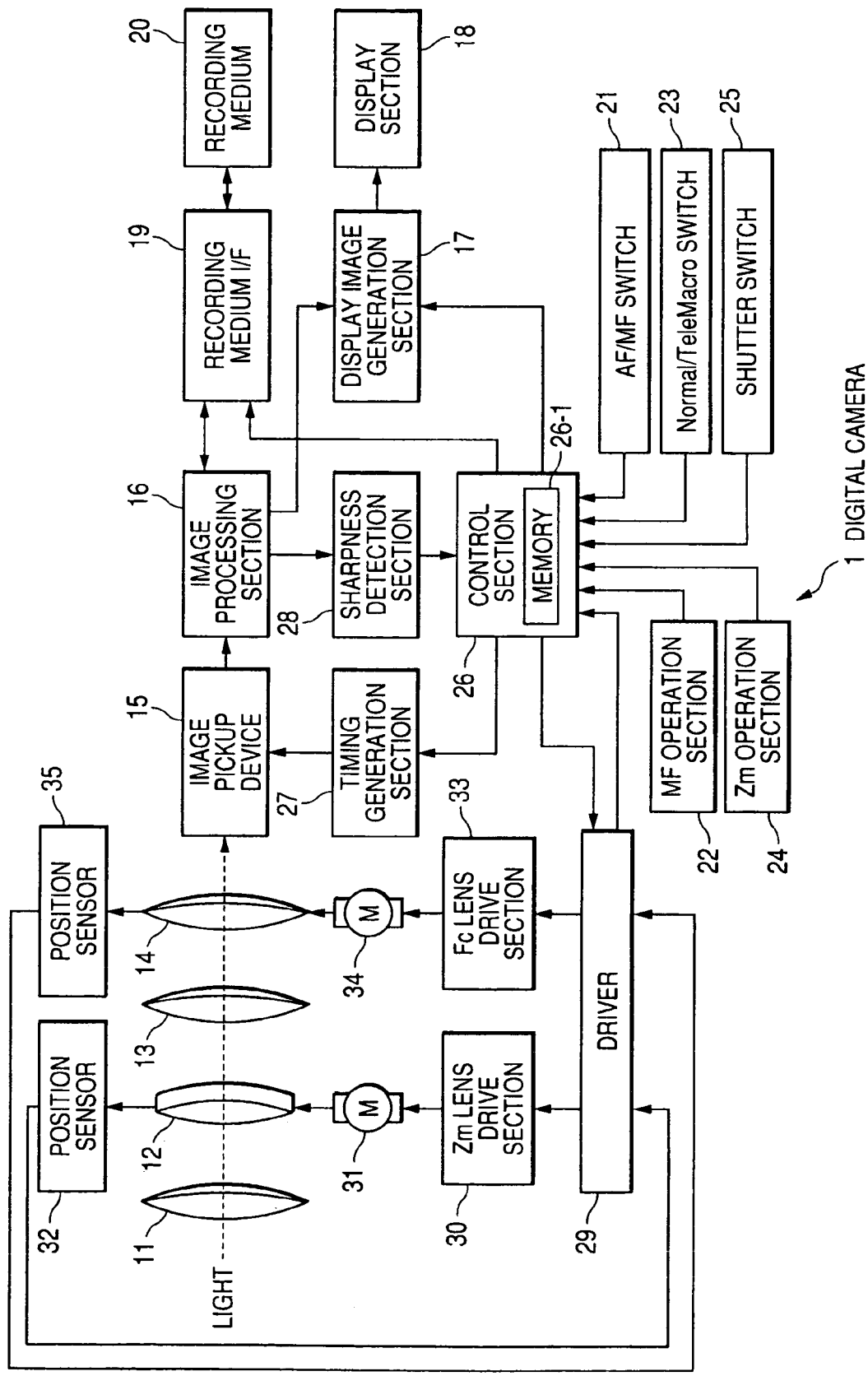
FIG. 2 is a block diagram showing an exemplary configuration of a digital camera applied with the present invention.

An image pickup device according to an embodiment of the present invention, e.g., a digital camera 1 of FIG. 2, is provided with: a focus mode switch unit, e.g., an AF/MF switch 21 of FIG. 2; a shooting mode switch unit, e.g., a normal/telemacro switch 23 of FIG. 2; a zoom lens drive unit, e.g., a Zm lens drive section 30 of FIG. 2; a focus lens drive unit, e.g., an Fc lens drive section 33 of FIG. 2; and a control unit, e.g., a control section 26 of FIG. 2. More specifically, the focus mode switch unit switches between an auto-focus mode in which an auto-focus feature is activated, and a manual mode in which the auto-focus feature is deactivated. The shooting mode switch unit switches between a telemacro mode in which a telemacro shooting feature is activated, and a normal mode in which the telemacro shooting feature is deactivated. The zoom lens drive unit drives a zoom lens to adjust a focus distance, and the focus lens drive unit drives a focus lens to adjust a shooting distance. The control unit exercises control over the zoom lens drive unit to move the zoom lens position to a telescope end in response to mode transition from normal to telemacro, and exercises control over the focus lens drive unit to move the focus lens position to an object-closest end in the telemacro mode.

The control unit according to another embodiment of the invention can move the zoom lens position to the telescope end in a positive direction being from a wide side to a telescope side for the zoom lens, and move the focus lens position with a monotonous increase to the object-closest end in the telemacro mode in another positive direction being from a far side to a close side for the focus lens. This is corresponding to a first background draw-in process of FIG. 4, for example.

The control unit according to still another embodiment of the invention can move the zoom lens position to the telescope end, and move the focus lens position to the object-closest end in the telemacro mode to allow a combination point of the zoom lens position and the focus lens position to move along a locus that passes an object-closest end of achieving focus with the zoom lens at a wide end. This is corresponding to a second background draw-in process of FIG. 5, for example.

In still another embodiment of the invention, a position space containing a combination point of the zoom lens position and the focus lens position in the normal mode is divided into first and second ranges along a locus that passes an object-closest end of achieving focus with the zoom lens at the telescope end in the normal mode. When the first range contains a combination point of an original zoom lens position and an original focus lens position, the control unit can move the zoom lens position to the telescope end in a positive direction being from the wide side to the telescope side for the zoom lens by way of the highest point of the locus, and move the shooting distance for the focus lens with a monotonous increase to the object-closest end in the telemacro mode. When the second range contains the combination point of the original zoom lens position and the original focus lens position, the control unit can move the combination point of the zoom lens position and the focus lens position to a point corresponding to the object-closest end in the telemacro mode after moving the combination point onto the locus to be up to the highest point therealong. This is corresponding to a third background draw-in process of FIG. 6, for example.

In still another embodiment of the invention, a position space containing a combination point of the zoom lens position and the focus lens position in the normal mode is divided into first and second ranges along a locus that passes an object-closest end of achieving focus with the zoom lens at the telescope end in the normal mode. When the first range contains a combination point of an original zoom lens position and an original focus lens position, the control-unit can move the zoom lens position to the telescope end in a positive direction being from the wide side to the telescope side for the zoom lens, and move the shooting distance for the focus lens with a monotonous increase to the object-closest end in the telemacro mode in another positive direction being from the far side to the close side for the focus lens. When the second range contains the combination point of the original zoom lens position and the original focus lens position, the control unit can move the zoom lens position to the telescope end in the positive direction by way of the highest point of the locus, and move the shooting distance for the focus lens with a monotonous increase to the object-closest end in the telemacro mode. This is corresponding to a fourth background draw-in process of FIG. 7, for example.

In still another embodiment of the invention, when the telemacro mode is switched to the normal mode during mode transition to telemacro, the control unit can stop the zoom lens from moving, and make the focus lens focus with an original shooting distance of before the mode transition to telemacro. This is corresponding to the operation of FIG. 8, for example.

In still another embodiment of the invention, when the auto-focus mode is switched to the manual focus mode during mode transition to telemacro, the control unit can move the focus lens position to a position corresponding to the shooting distance of before the mode transition to telemacro. This is corresponding to the operation of FIG. 9, for example.

An image pickup method according to an embodiment of the present invention includes a control step of moving the zoom lens position to the telescope end through control over the zoom lens drive unit when the normal mode is switched to the telemacro mode, and moving the focus lens position to the object-closet end in the telemacro mode through control over the focus lens drive unit. This is corresponding to step S11 of FIG. 10.

Note here that the components described in claims of the invention for a program has a correlation with specific examples of the embodiments of the invention similarly to that for the above-described image pickup method of the invention, and therefore no description is made again.

In the below, a specific embodiment applied with the present invention is described in detail by referring to the accompanying drawings.

FIG. 2 shows an exemplary configuration of a digital camera as an embodiment of the present invention. A digital camera 1 serves to pick up and encode moving and still images, and record the resulting encoding data onto a recording medium 20. This digital camera 1 is provided with an auto-focus feature, and a zoom feature. The optical system of this digital camera 1 is of inner focus, and has a telemacro feature. The digital camera 1 is so configured as not to cause background draw-in even if mode transition is made from a general shooting mode, i.e., normal mode, to a telemacro mode. The details are left for later description.

The digital camera 1 is configured by an optical system, an image processing system, an operation control system, and an optical drive system. The optical system serves to pick up optical images of an object, and is configured to include a fixed lens 11, a zoom lens 12, another fixed lens 13, and a focus lens 14. As to the zoom lens 12 and the focus lens 14, the optical drive system excises control over their movements.

The image processing system is configured to include an image pickup device 15, an image processing section 16, a display image generation section 17, a display section 18, and a recording medium interface (I/F) 19. More specifically, the image pickup device 15 subjects the optical images picked up by the optical system to optical-electrical conversion, and derives image signals. The image processing section 16 subjects the resulting image signals to predetermined image processing. The display image generation section 17 generates display images for display on the display section 18. The display images are those derived by pixel decimation. The display section 18 displays thereon the display images. The recording medium I/F 19 serves to record the image signals encoded by the image processing section 16, i.e., encoded data, onto a recording medium 20.

The image pickup device 15 is exemplified by a CCD (Charge Coupled Device), a CMOS (Complementary Mental-Oxide Semiconductor), or others, and serves to forward the accumulated electric charge to the image processing section 16 based on the control exercised by a timing generation section 27. The electric charge is corresponding to the pixel values of the image signals. The image processing section 16 applies image processing to the image signals coming from the image pickup device 15. The image processing here includes noise elimination, autogain, or others. The resulting image signals are forwarded to the display image generation section 17, and a sharpness detection section 28. The image processing section 16 encodes the image signals after image processing into MPEG (Moving Picture Experts Group) 2 or others. The resulting encoded data is forwarded to the recording medium I/F 19. The encoded data read by the recording medium I/F 19 from the recording medium 20 is decoded for output to the display image generation section 17.

The display 18 is exemplified by a liquid crystal display or others, and serves as a finder for user check of image composition at shooting, or as a monitor display at image playback. The recording medium 20 is exemplified by a magnetic tape, an optical disk, a magneto-optical disk, semiconductor memory, or others. The recording medium 20 is so configured as to be attachable/detachable to/from the recording medium I/F 19.

The operation control system is configured to include an AF/MF switch 21, an MF operation section 22, a Normal/Telemacro switch 23, a Zm operation section 24, a shutter switch 25, a control section 26, the timing generation section 27, and the sharpness detection section 28. More specifically, the AF/MF switch 21 is provided for user switching between an auto-focus mode and a manual focus mode. The MF operation section 22 is for user adjustment of a shooting distance in the manual focus mode. The Normal/Telemacro switch 23 is for user switching between a normal mode and a telemacro mode. The Zm operation section 24 is for user adjustment of a focus distance. The shutter switch 25 is for user instruction to start or complete shooting in which timing. The control section 26 exercises control over the components of the digital camera 1. The timing generation section 27 exercises control over the image pickup device 15, in which timing the accumulated charge is to be output. The sharpness detection section 28 calculates the image sharpness based on high frequency components of the image signals coming from the image processing section 16.

The components of the AF/MF switch 21, the MF operation section 22, the Normal/Telemacro switch 23, the Zm operation section 24, and the shutter switch 25 are all provided on the outer surface of the main body of the digital camera 1. These components each accept user operation, and provide the control section 26 with each corresponding operation signal.

The control section 26 follows a control program stored in its internal memory 26-1 to exercise control over the components of the display image generation section 17, the recording medium I/F 19, the timing generation section 27, and a driver 29. For such control application, used as basis are the operation signals coming from the AF/MF switch 21 and the shutter switch 25, and the sharpness provided by the sharpness detection section 28. The control section 26 also stores, in the memory 26-1, the shooting distance corresponding to the position information about the focus lens 14 provided by the driver 29.

The optical drive system is configured to include the driver 29, a Zm lens drive section 30, a zoom lens drive motor 31, a position sensor 32, an Fc lens drive section 33, a focus lens drive motor 34, and another position sensor 35. More specifically, the driver 29 serves to determine the drive amount of both the zoom lens 12 and the focus lens 14. The Zm lens drive section 30 drives the zoom lens drive motor 31, and the zoom lens drive motor 31 drives the zoom lens 12. The position sensor 32 detects the current position of the zoom lens 12, and the position sensor 35 detects the current position of the focus lens 14. The Fc lens drive section 33 drives the focus lens driver motor 34, and the focus lens drive motor 34 drives the focus lens 14.

Based on the focus distance or a new position for the zoom lens 12 instructed by the control section 26, the driver 29 determines the amount of drive for the zoom lens 12 through comparison with the current position of the zoom lens 12 provided by the position sensor 32. A drive signal corresponding to thus determined amount of drive is forwarded to the Zm lens drive section 30. Based on the shooting distance or a new position for the focus lens 14 instructed by the control section 26, the driver 29 determines the amount of drive for the focus lens 14 through comparison with the current position of the focus lens 14 provided by the position sensor 35. A drive signal corresponding to thus determined amount of drive is forwarded to the Fc lens drive section 33.

Described next is the basic operation of the digital camera 1. When the digital camera 1 is turned ON, the optical system including the fixed lens 11 and the focus lens 14 direct an optical image of an object to the image pickup device 15. At this time, the zoom lens 12 is driven in accordance with user operation made to the Zm operation section 24, and is adjusted to any desired focus distance. The image pickup device 15 generates an image signal corresponding to the optical image through optical-electrical conversion for output to the image processing section 16. The image processing section 16 subjects thus provided image signal to predetermined image processing, and forwards the result to both the display image generation section 17 and the sharpness detection section 28.

The display image generation section 17 generates an image signal for output to the display section 18 for display thereon. In the auto-focus mode, the sharpness detection section 28 detects high frequency components of the image signal, and based on the detection result, the image sharpness is calculated for output to the control section 26. The control section 26 then has the drive 29 change the new position for the focus lens 14 in such a manner that the sharpness coming from the sharpness detection section 28 becomes the highest or maximum in value. In response, the driver 29 refers to the current position of the focus lens 14 provided by the position sensor 35 to determine the amount of drive for the focus lens 14. A drive signal corresponding thereto is then forwarded to the Fc lens drive section 33.

Once shooting is started, the image processing section 16 encodes the image signal having been subjected to the predetermined image processing for output to the recording medium I/F 19. The resulting encoding data is forwarded by the recording medium I/F 19 to the recording medium 20 for recording thereonto.

Figure 3:
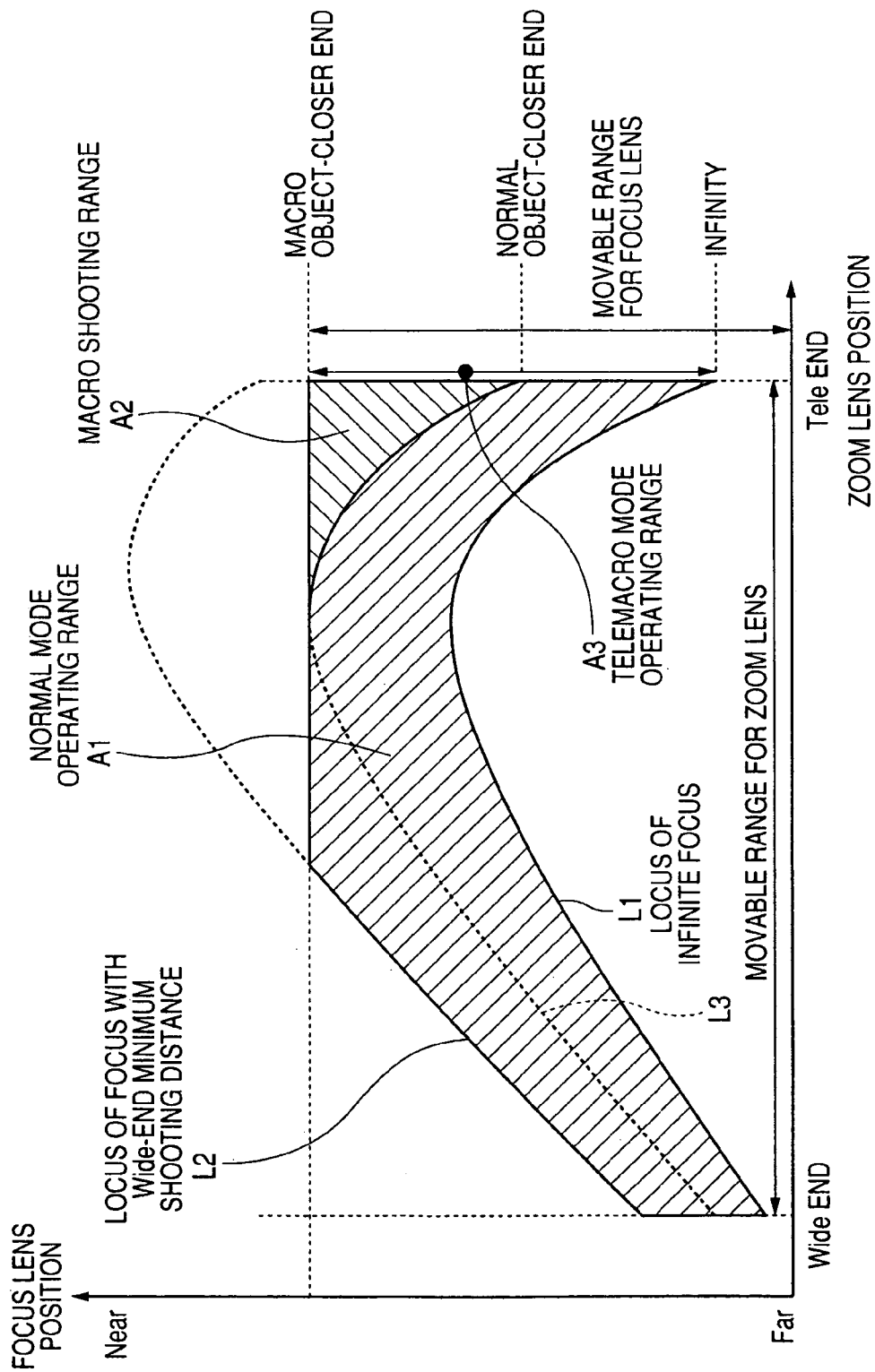
FIG. 3 is a diagram showing the operating range for a normal mode, a macro mode, and a telemacro mode in a position space, which is a combination of a movable range for a zoom lens and that for a focus lens.

By referring to FIG. 3, described next is the operating range for the normal, macro, and telemacro modes in a position space in combination of the movable range for the zoom lens 12 of the digital camera 1, and that for the focus lens 14 thereof.

In the position space, the lateral axis is set to the physical movable range for the zoom lens 12, and the left direction (decreasing direction) is the wide side, and the right direction (increasing direction) is the telescope side. Moreover, the longitudinal axis is set to the physical movable range for the focus lens 14, and the down direction (decreasing direction) is the far side, and the up direction (increasing direction) is the near side. In the below, the wide side end is referred to as wide end, and the telescope side end as tele end.

In the drawing, a curve L1 denotes the locus of points corresponding to combinations of the zoom lens position and the focus lens position of infinity focus. A curve L2 denotes the locus of points corresponding to combinations of the zoom lens position and the focus lens position of focus with the shortest shooting distance at the wide end. A curve L3 denotes the locus of points corresponding to combinations of the zoom lens position and the focus lens position of focus with the shortest shooting distance being the longest in the entire operating range for zooming, i.e., the shortest shooting distance at the tele end in the normal mode.

An operating range A1 for the normal mode is enclosed by the curves L1 to L3, and the macro object-closer end for the focus lens 14. In the normal mode, position-adjustment is possible only in this range A1 for the zoom lens position and the focus lens position.

With the digital camera 1 of inner focus system, a macro mode range A2 is provided on the tele side as shown in the drawing. In the telemacro mode, the operable range for the focus lens 14 is expanded with the zoom lens 12 fixed at the tele end so that an operating range A3 will be linear as shown in the drawing.

By referring to FIGS. 4 to 7, described next is the operation of first to fourth background draw-in processes when mode transition is made from normal to telemacro. Similarly to FIG. 3, FIGS. 4 to 7 show the position space in combination of the movable range for the zoom lens 12, and the movable range for the focus lens 14. All in the first to fourth background draw-in processes, in response to mode transition made from normal to telemacro, eventually, the zoom lens 12 is moved to the tele end, and the focus lens 14 is moved to the macro object-closer end. The dissimilarity among the first to fourth background draw-in processes lies in their movement paths.

Figure 4:
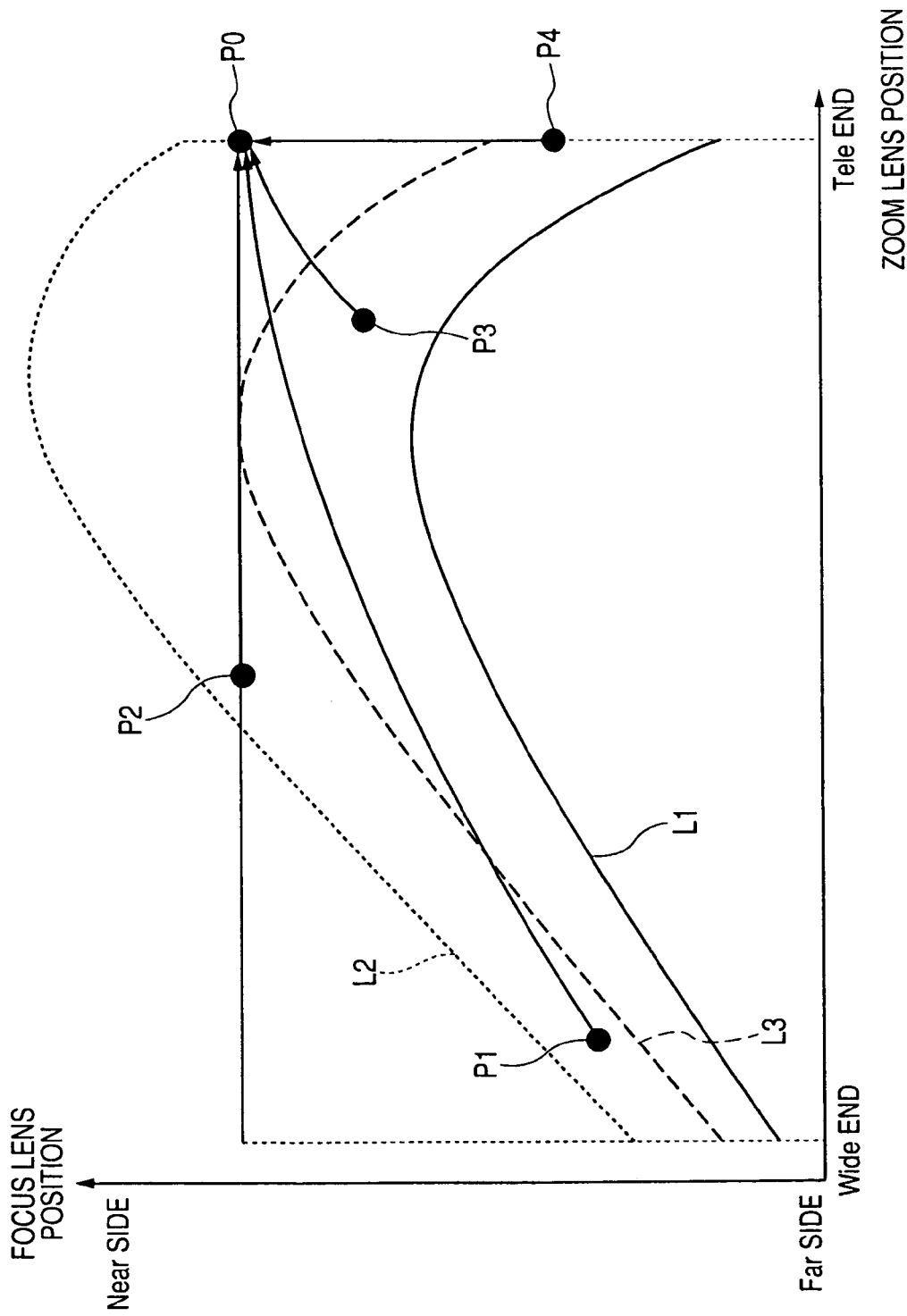
FIG. 4 is an overview diagram for illustrating a first background draw-in process.

The first background draw-in process is of the auto-focus mode, and when mode transition is made from normal to telemacro, as shown in FIG. 4, the zoom lens 12 is moved to the tele end if not. At the same time, the focus lens 14 is moved to the macro object-closer end if not. The movement path for the zoom lens 12 and that for the focus lens 14 are both so controlled as to show a monotonous increase.

When mode transition is made from normal to telemacro at a point P1, the lens position is moved to a point P0 with a monotonous increase. When mode transition is made from normal to telemacro at a point P2, the zoom lens 12 is linearly moved to the point P0 because the focus lens 14 is already at the telemacro end. When mode transition is made from normal to telemacro at a point P4, the focus lens 14 is linearly moved to the point P0 because the zoom lens 12 is already at the tele end.

As such, with the first background draw-in process, when mode transition is made from normal to telemacro in the auto-focus mode, during such mode transition to telemacro the lens position will be located in the operating range A1 for the normal mode or in the operating range A2 for the macro mode. Accordingly, the display section 18 displays no images with lens dirt or dust, or focused-in-optical-system images, and the focus lens can reach, in a short time, the position corresponding to the shortest shooting distance for the telemacro mode.

Figure 5:
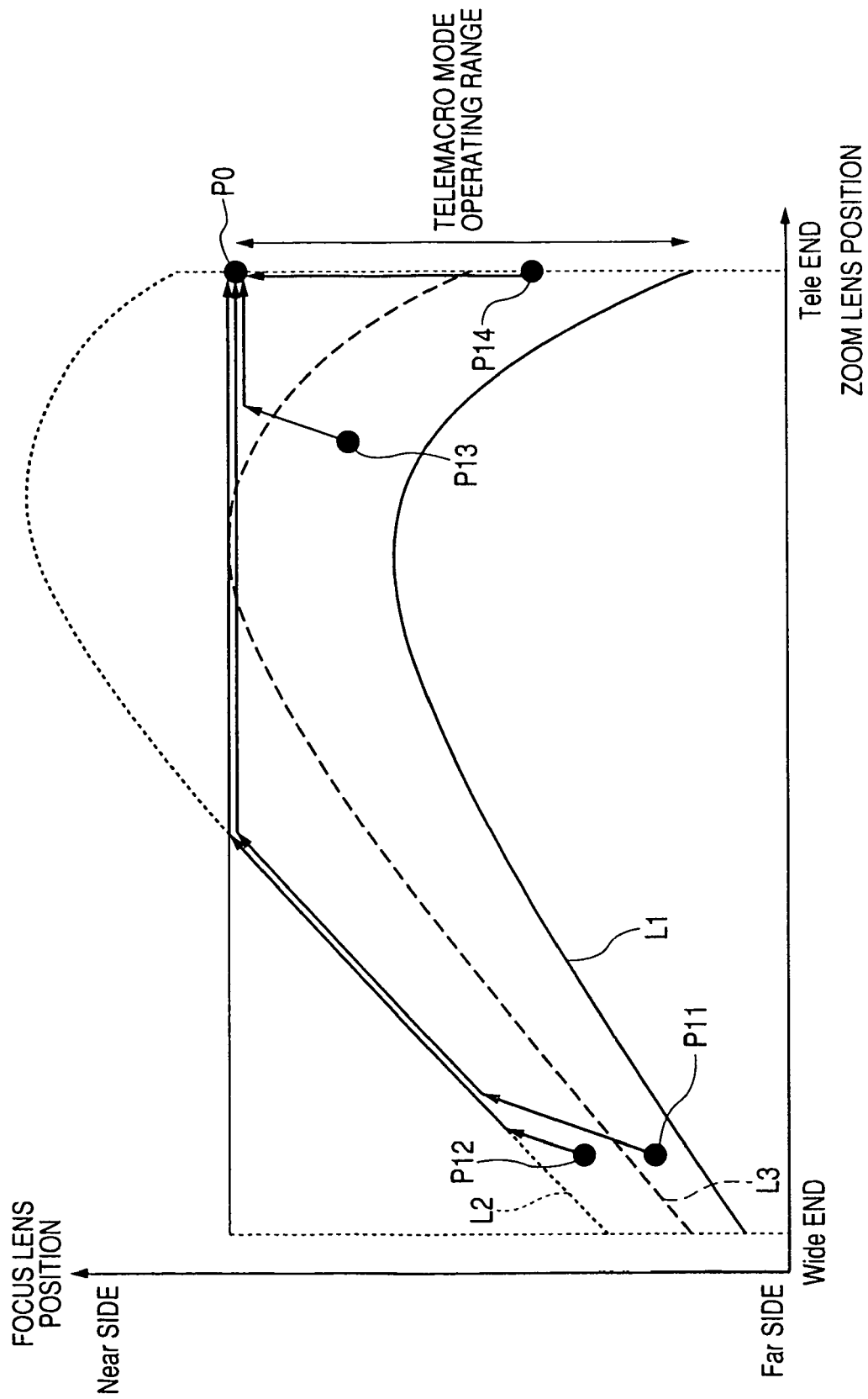
FIG. 5 is an overview diagram for illustrating a second background draw-in process.

The second background draw-in process is of the auto-focus mode, and when mode transition is made from normal to telemacro, as shown in FIG. 5, the lens position is swiftly moved onto the curve L2, which is the locus of points corresponding combinations of the zoom lens position and the focus lens position of focus with the shortest shooting distance at the wide end. Thereafter, along the curve L2, the zoom lens 12 and the focus lens 14 are moved to the point P0.

When mode transition is made from normal to telemacro at a point P11 or P12, the lens position is swiftly moved onto the curve L2. Thereafter, after the focus lens 14 reaches the macro object-closer end along the curve L2, the zoom lens 12 is linearly moved to the point P0. When mode transition is made from normal to telemacro at a point P13, the focus lens 14 is swiftly moved to the macro object-closer end, and the zoom lens 12 is linearly moved to the point P0. When mode transition is made from normal to telemacro at a point P14, the focus lens 14 is linearly moved to the point P0 because the zoom lens 12 is already at the tele end.

As such, with the second background draw-in process, when mode transition is made from normal to telemacro in the auto-focus mode, during such mode transition to telemacro, the display section 18 displays no images with lens dirt or dust or focused-in-optical-system images, and the focus lens can reach, in a short time, the position corresponding to the shortest shooting distance for the telemacro mode.

Figure 6:
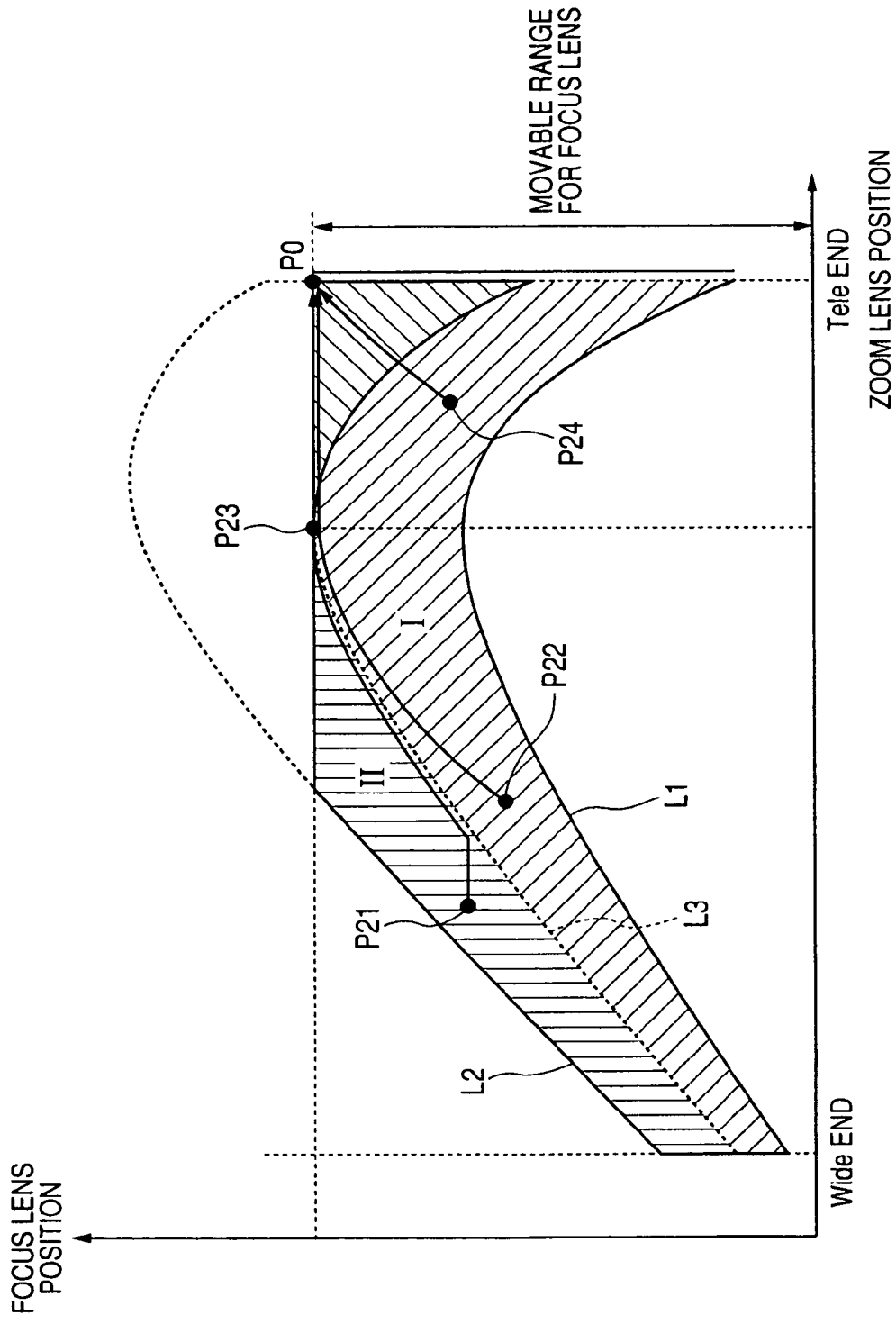
FIG. 6 is a an overview diagram for illustrating a third background draw-in process.

With the third background draw-in process, as shown in FIG. 6, the operating range A1 is divided along the curve L3 into two for the normal mode. The resulting range below the curve L3 is referred to as range I, and the range upper the curve L3 is referred to as range II. When mode transition is made from normal to telemacro in the auto-focus mode, when the lens position is in the range I at the highest point of the curve L3 on the wide side, the lens position is moved to a point P23 at the macro object-closer end on the curve L3 in such a manner that the shooting distance shows a monotonous decrease. Thereafter, the lens position is linearly moved to the point P0. When the lens position is in the range I at the highest point of the curve L3 on the tele side, the lens position is moved to the point P0 in such a manner that the shooting distance shows a monotonous decrease. When the lens position is in the range II, the position of the focus lens 14 is fixedly moved onto the curve L3, and then to the point P23 along the curve L3. The zoom lens 12 is then linearly moved to the point P0.

When mode transition is made from normal to telemacro with the lens position at a point P21, it means that the lens position is in the range II. Therefore, the lens position is moved in the lateral direction to be on the curve L3, and then moved to the point P23 along the curve L3. The zoom lens 12 is then linearly moved to the point P0. Assuming that if mode transition is made from normal to telemacro with the lens position at a point P22, it means that the lens position is in the range I. Therefore, the lens position is moved to the point P23 in such a manner that the shooting distance shows a monotonous decrease, and the zoom lens 12 is linearly moved to the point P0. Note here that, if mode transition is made from normal to telemacro with the lens position at a point P24, the lens position is in the range I but the zoom lens 12 is already closer to the side of the tele end than the point P23. Accordingly, the lens position is moved to the point P0 in such a manner that the shooting distance shows a monotonous decrease.

With such a third background draw-in process, it becomes possible to minimize the inversion frequency in the direction of changing the shooting distance during mode transition to telemacro.

Figure 7:
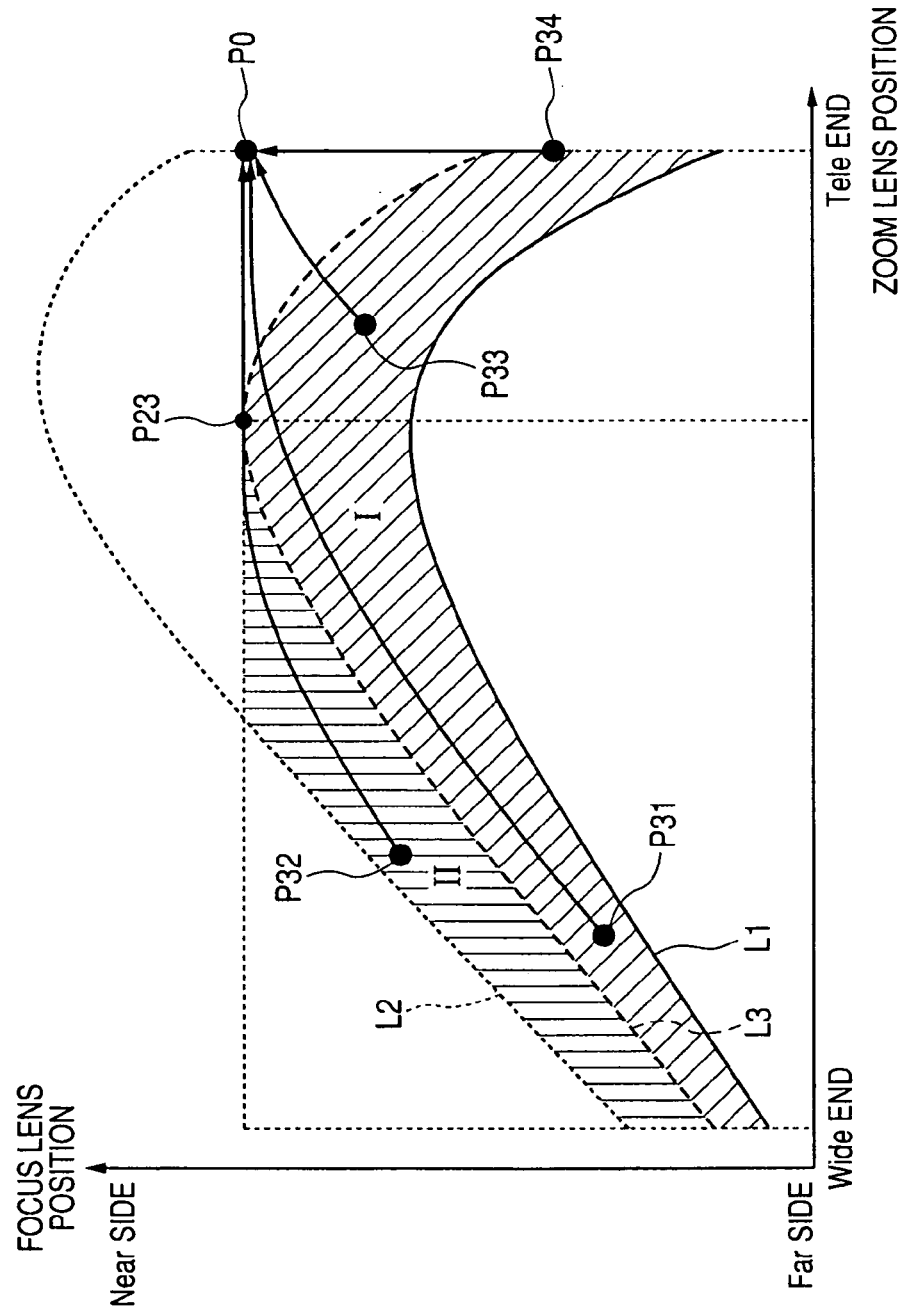
FIG. 7 is an overview diagram for illustrating a fourth background draw-in process.

With the fourth background draw-in process, as shown in FIG. 7, the operating range A1 is divided along the curve L3 into two for the normal mode similarly to the third background draw-in process. The resulting range below the curve L3 is referred to as range I, and the range upper the curve L3 is referred to as range II. When mode transition is made from normal to telemacro, and when the lens position is in the range I, the lens position is moved to the point P0 in such a manner that the shooting distance shows a monotonous decrease. When the lens position is in the range II, the lens position is moved to the point P23 at the macro object-closer end on the curve L3 in such a manner that the shooting distance shows a monotonous increase, and then linearly to the point P0.

Assuming that mode transition is made from normal to telemacro with the lens position at a point P31 or P33, it means that the lens position is in the range I. Accordingly, the lens position is moved to the point P0 in such a manner that the shooting distance shows a monotonous decrease. If mode transition is made from normal to telemacro with the lens position at the point P32, the lens position is moved to the point P23 in such a manner that the shooting distance shows a monotonous increase, and then linearly to the point P0.

With such a fourth background draw-in process, it becomes possible to minimize the inversion frequency in the direction of changing the shooting distance during mode transition to telemacro.

Figure 8:
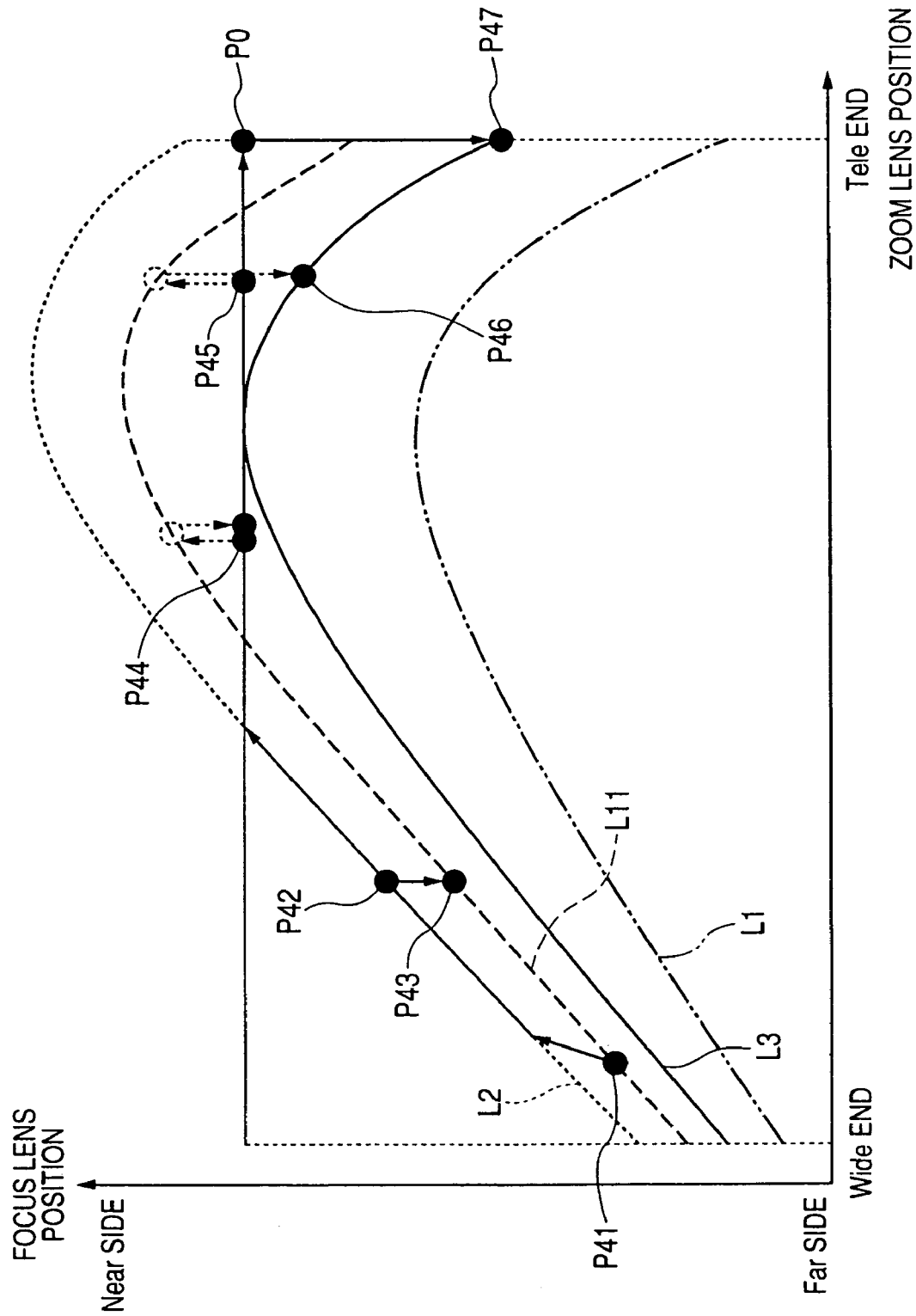
FIG. 8 is a diagram for illustrating the operation when an interruption occurs to mode transition to telemacro.

By referring to FIG. 8, described next is the operation when mode transition is first made from normal to telemacro in the auto-focus mode, but then again back to normal before the lens position reaches the eventual target position of the point P0. Similarly to FIG. 3 in the above, FIG. 8 also shows a position space in combination of the movable range for the zoom lens 12, and that for the focus lens 14.

Assuming here is a case where the second background draw-in process is in progress, and mode transition is made from normal to telemacro with the lens position at a point P41. In such a case, the shooting distance corresponding to the focus lens position at the point P41 is stored, and then the focus lens position and the zoom lens position are both swiftly moved onto the curve L2. The focus lens position is then moved along the curve L2 to the macro object-closer end, and the zoom lens position is linearly moved to the point P0. If mode transition is made to normal during such lens position movement, and if the lens movement is interrupted on the way to the point P0, the zoom lens 12 is stopped from moving. The focus lens position is then moved onto a curve L11, which is the locus of points corresponding to combinations of the zoom lens position and the focus lens position of focus with the shooting distance corresponding to the stored point P41.

If the lens movement is interrupted when the lens position is at the point P42, the lens position is moved to the point P43 on the curve L11. Assuming if the lens movement is interrupted with the lens position at the point P44, the lens position cannot be moved onto the curve L11 so that the position at the P44 is reserved. If the lens movement is interrupted when the lens position is at a point P45, the lens position is moved to a P46 on the curve L3. If the lens position is already moved to the point P0, the lens position will be moved to a point P47 on the curve L3.

With such an operation, if the lens movement is interrupted on the way to the point P0 during when mode transition is made to telemacro in the auto-focus mode, it becomes possible to reduce the time for focusing again.

Figure 9:
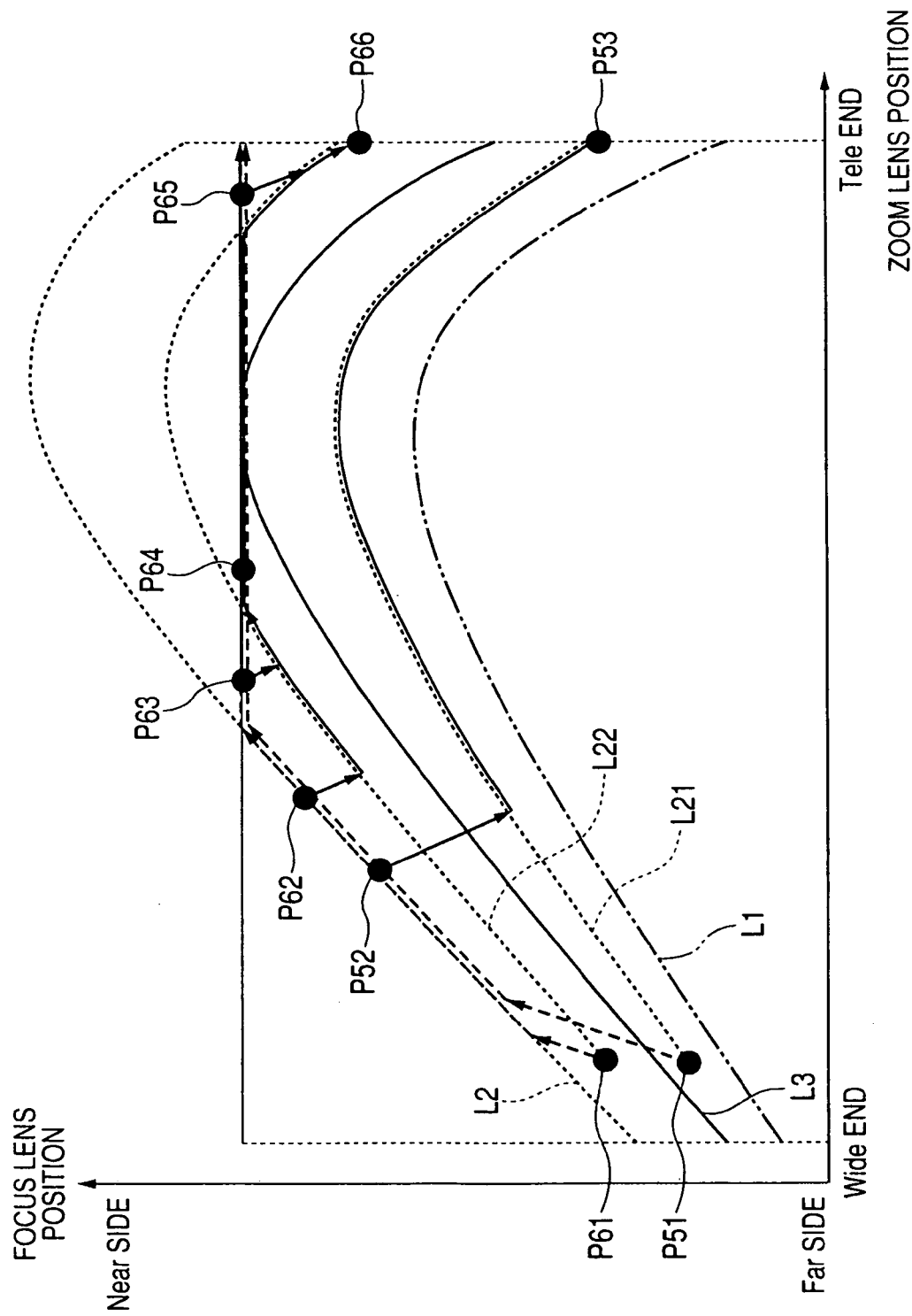
FIG. 9 is a diagram for illustrating the operation when mode switching is made to manual during mode transition to telemacro.

By referring to FIG. 9, described next is the operation when mode transition is first made from normal to telemacro in the auto-focus mode, but then to manual focus from auto-focus before the lens position reaches the eventual target position of the point P0. Similarly to FIG. 3 in the above, FIG. 9 also shows a position space in combination of the movable range for the zoom lens 12, and that for the focus lens 14.

Assuming here is a case where the second background draw-in process is in progress, and mode transition is made from normal to telemacro with the lens position at a point P51. In such a case, the shooting distance corresponding to the focus lens position at the point P51 is stored, and then the focus lens position and the zoom lens position are both swiftly moved onto the curve L2. The focus lens position is then moved along the curve L2 to the macro object-closer end, and the zoom lens position is linearly moved to the point P0.

If mode transition is made to manual focus at a point P52 on the way to the point P0, while moving the zoom lens 12, the focus lens position is moved onto a curve L21, which is the locus of points corresponding to combinations of the zoom lens position and the focus lens position of focus with the shooting distance corresponding to the stored point P51. Thereafter, the lens position reaches a point P53 along a curve L21. Although the curve L21 is allowed to pass not only the operating range A1 for the normal mode but also the macro range A2, the curve L21 does not pass the macro range A2 in this example.

If mode transition is made from normal to telemacro with the lens position at a point P61, the shooting distance corresponding to the focus lens position at the point P61 is stored, and then the focus lens position and the zoom lens position are both swiftly moved on to the curve L2. Thereafter, the focus lens position is moved along the curve L2 to the macro object-closer end, and the zoom lens position is linearly moved to the point P0.

If mode transition is made to manual focus on the way to the point P0, while moving the zoom lens 12, the focus lens position is moved onto a curve L22, which is the locus of points corresponding to combinations of the zoom lens position and the focus lens position of focus with the shooting distance corresponding to the stored point P61. Thereafter, the lens position reaches the point P56 along the curve L22. The curve L22 is allowed to pass not only the operating range A1 in the normal mode but also the macro range A2. Accordingly, if mode transition is made to manual focus at a point P65 on the way to the point P0, the lens position is moved onto the curve L22 in the macro range A2, and reaches the point P56 along the curve L22.

With such an operation, if the lens movement is interrupted on the way to the point P0 during when mode transition is made to telemacro in the auto-focus mode, it becomes possible to reduce the time for manual focusing.

Figure 10:
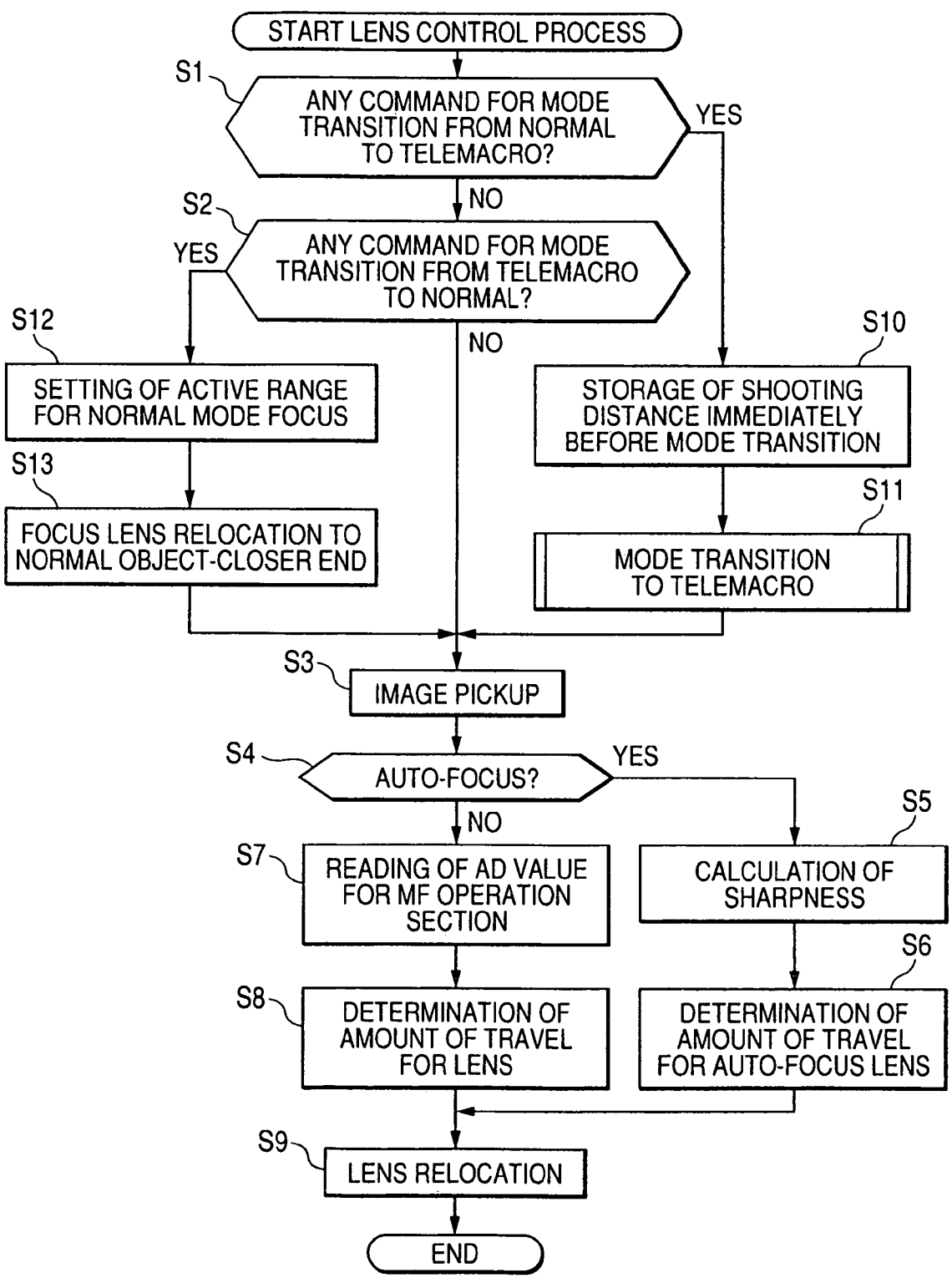
FIG. 10 is a flowchart for illustrating a lens control process by a digital camera according to an embodiment of the present invention.

By referring to the flowcharts of FIGS. 10 to 12, described next is a lens control process to be executed by the digital camera 1. This lens control process includes the second background draw-in process, which is the most typical among the first to fourth background draw-in processes. The lens control process also includes, in detail, the process when mode transition into telemacro is interrupted, and the process when mode transition is made from auto-focus to manual during mode transition to telemacro.

This lens control process is started when the digital camera 1 is turned ON. In response to such power ON, the optical system picks up an optical image, and the image processing system generates an image signal. In step S1, the control section 26 determines whether a user issues a command for mode transition from normal to telemacro. Here, the determination factor therefor is whether an operation signal is provided by the Normal/Telemacro switch 23, and if provided, the signal details. When the control section 26 determines that there is no such command from the user, the procedure goes to step S2. In step S2, the control section 26 determines whether a user issues a command for mode transition from normal to telemacro. The determination factor therefor is whether an operation signal is provided by the Normal/Telemacro switch 23, and if provided, the signal details. When the control section 26 determines that there is no such command from the user, the procedure goes to step S3.

In step S3, image pickup is started. If the user operates to start recording at this time, recording of the encoded data is accordingly started onto the recording medium 20.

In step S4, the control section 26 determines whether the mode is auto-focus or not by checking whether an operation signal is provided from the AF/MF switch 21, and if provided, the signal details. When the control section 26 determines that the mode is auto-focus, the procedure goes to step S5. In step S5, the sharpness detection section 28 calculates the image sharpness based on high frequency components of the image signal coming from the image processing section 16. Thus calculated sharpness is forwarded to the control section 26. In step S6, the control section 26 determines the shooting distance for the focus lens 14 for notification to the driver 29. The shooting distance is so determined that the sharpness notified by the sharpness detection section 28 indicates the highest or maximum value. For implementation of the shooting distance notified by the control section 26, the driver 29 determines the amount of drive for the focus lens 14 based on the current position of the focus lens 14 provided by the position sensor 35. A drive signal corresponding to thus determined amount of drive is forwarded to the Fc lens drive section 33. In step S9, the Fc lens drive section 33 drives the focus lens drive motor 34 based on the drive signal inputted. As a result, the focus lens 14 is adjusted by position, and the focus-achieved image signal can be captured.

In step S4, when the control section 26 determines that the mode is not auto-focus, i.e., the mode is manual focus, the procedure goes to step S7. In step S7, the control section 26 acquires an A/D value corresponding to the user operation based on the operation signal coming from the MF operation section 22. In step S8, the control section 26 determines the shooting distance for the focus lens 14 corresponding to the A/D value coming from the MF operation section 26 for notification to the driver 29. For implementation of the shooting distance notified by the control section 26, the driver 29 determines the amount of drive for the focus lens 14 based on the current position of the focus lens 14 provided by the position sensor 35. A drive signal corresponding to thus determined amount of drive is forwarded to the Fc lens drive section 33. The procedure then goes to step S9, and the Fc lens drive section 33 drives the focus lens drive motor 34 so that the focus lens 14 is adjusted by position.

In step S1, when the determination is made that a user command comes for mode transition from normal to telemacro, the procedure goes to step S10. In step S10, based on the position information about the current position of the focus lens 14 acquired by the position sensor 35 and provided by the driver 29, the control section 26 calculates the shooting distance of before mode transition to telemacro for storage into the memory 26-1. In step S11, a process is executed for mode transition to telemacro, which will be described in detail later by referring to the flowchart of FIG. 11.

In step S2, when the determination is made that a user command comes for mode transition from telemacro to normal, the procedure goes to step S12. In step S12, the control section 26 makes a notification to the driver 29 to set the operable range for the focus lens 14, covering the infinity to normal object-closer end. In step 13, the control section 26 defines the focus lens 14 by position, i.e., closest in the operable range for the normal mode, for notification to the driver 29. The driver 29 accordingly moves the focus lens 14 to the position notified from the control section 26. For such lens movement, the driver 29 determines the amount of drive for the focus lens 14 based on the current position thereof provided by the position sensor 35, and forwards a drive signal corresponding thereto to the Fc lens drive section 33. In response to such a drive signal, the focus lens drive motor 34 is driven, and the focus lens 14 is moved to the position as instructed. The procedure then goes to step S3 for processes onwards.

Figure 11:
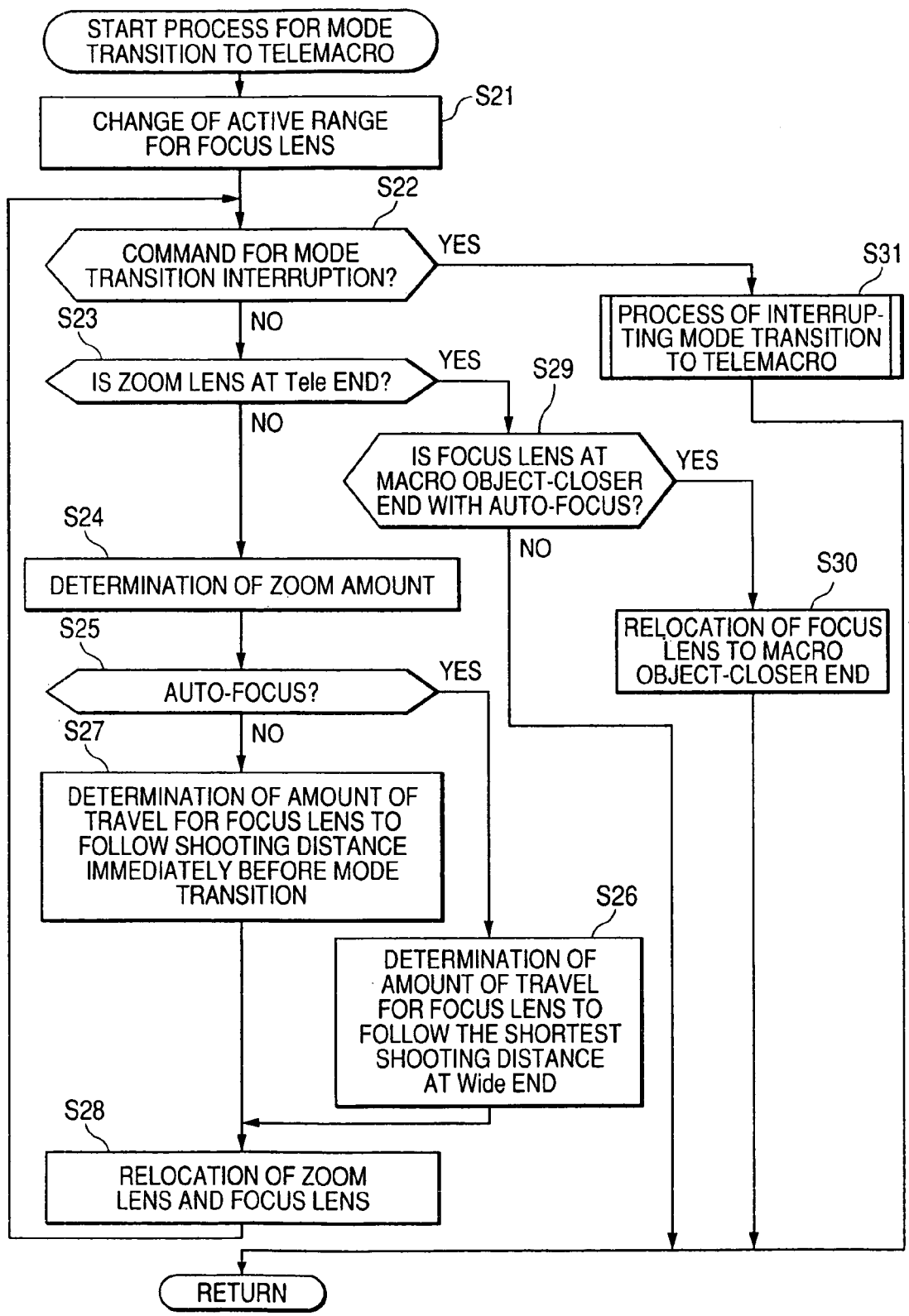
FIG. 11 is a flowchart for illustrating a mode transition process to telemacro in step S11 of FIG. 10.
Figure 12:
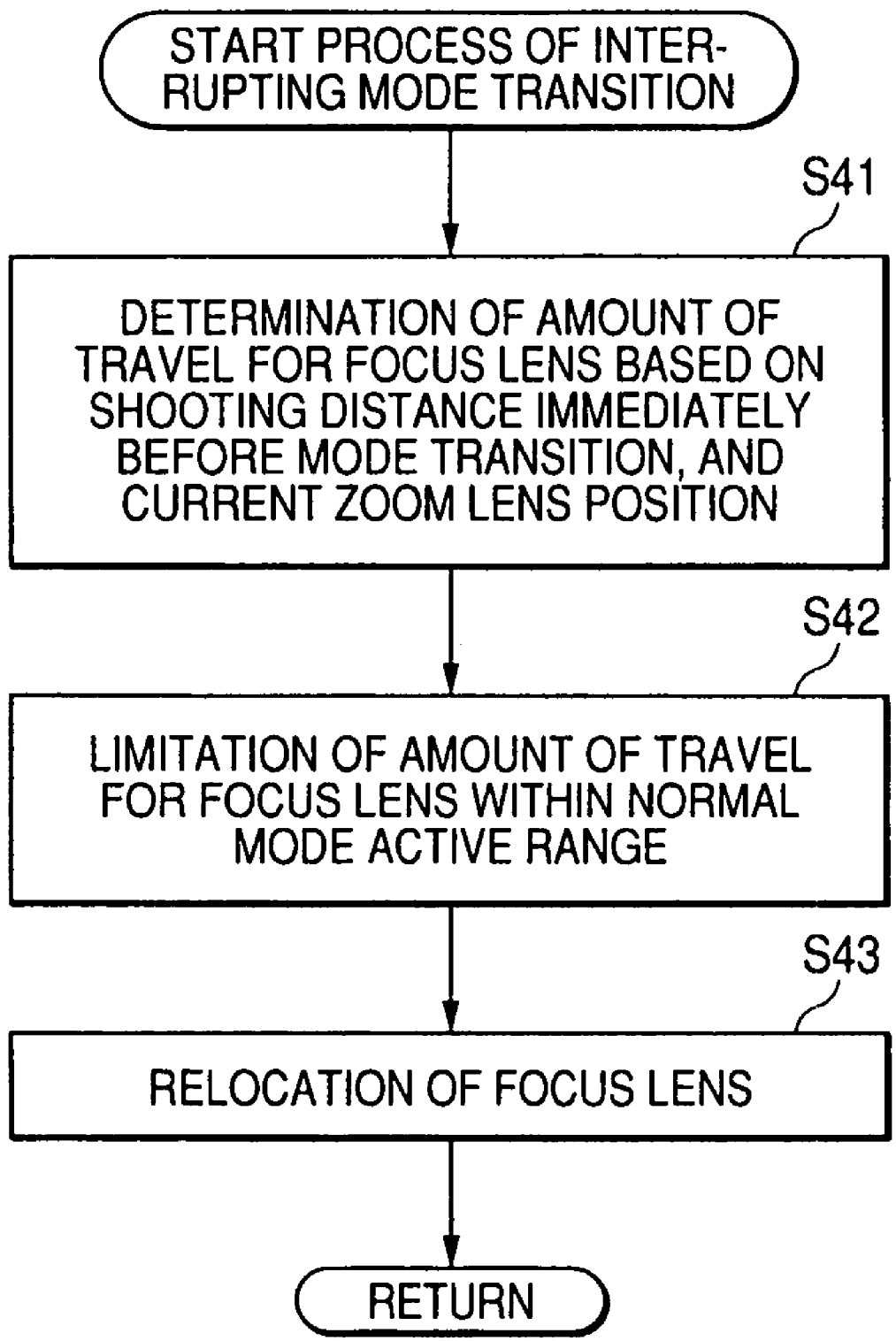
FIG. 12 is a flowchart for illustrating a transition interruption process in step S31 of FIG. 11.

By referring to the flowchart of FIG. 11, described now is a process for mode transition to telemacro in step S11. In step S21, the control section 26 sets the operable range for the focus lens 14 to cover the infinity to the macro object-closer end, and makes a notification to the driver 29. In step S22, the control section 26 determines whether the user issues a command to interrupt the mode transition to telemacro. The determination factor therefor is whether an operation signal is provided by the Normal/Telemacro switch 23 for selection of the normal mode, or whether an operation signal is provided by the Zm operation section 24 for adjustment of the zoom lens 12 onto the wide side. When the determination is made that there is no such command from the user, the procedure goes to step S23.

In step S23, the control section 26 determines whether the zoom lens 12 is at the tele end. When the determination is made that the zoom lens 12 is not at the tele end, the procedure goes to step S24 to make a setting of the amount of travel for the zoom lens 12 to a predetermined unit amount, and make a notification to the driver 29. In step S25, the control section 26 determines whether the mode is auto-focus. The determination factor therefor is whether an operation signal is provided by the AF/MF switch 21, and if provided, the signal details. When the determination is made that the mode is auto-focus, the procedure goes to step S26.

In step S26, the control section 26 determines the shooting distance for the focus lens 14 corresponding to the amount of travel determined in step S24 for the zoom lens 12. The shooting distance is so determined as to follow the shortest shooting distance at the wide end, i.e., the combination point of the zoom lens 12 and the focus lens 14 comes onto the curve L2 of FIG. 5. Thus determined shooting distance is notified to the driver 29. The driver 29 then determines the amount of travel in accordance with the notified shooting distance for the focus lens 14.

When the determination in step S25 is made that the mode is not auto-focus but manual focus, the procedure goes to step S27. In step S27, the control section 26 determines the shooting distance for the focus lens 14 corresponding to the amount of travel determined in-step S24 for the zoom lens 12. The shooting distance is so determined as to follow the shooting distance in the memory 26-1 stored in step S10 before mode transition. Thus determined shooting distance is notified to the driver 29. The driver 29 then determines the amount of travel in accordance with the notified shooting distance for the focus lens 14.

In step S28, the driver 29 forwards, to the Zm lens drive section 30, the drive signal corresponding to the determined amount of travel for the zoom lens 12. The zoom lens drive motor 31 is driven in response to such a drive signal, and the position of the zoom lens 12 is accordingly moved toward the wide side by a predetermined unit amount. The driver 29 also forwards, to the Fc lens drive section 33, the drive signal corresponding to the determined amount of travel for the focus lens 14. The focus lens drive motor 34 is driven in response to such a drive signal, and the position of the focus lens 14 is accordingly moved. Thereafter, the procedure goes to step S22 for processes onwards.

In step S23, when the determination is made that the zoom lens 12 is at the tele end, the procedure goes to step S29. In step S29, a determination is made whether the mode is auto-focus, and whether the focus lens 14 is not yet at macro object-closer end. When it is determined that the mode is auto-focus but the focus lens 14 is not yet at the macro object-closer end, the procedure goes to step S30. In step S30, the control section 26 sets the position of the zoom lens 12 at the macro object-closer end, and makes a notification to the driver 29. The driver 29 then forwards a drive signal corresponding to the amount of travel to the macro object-closer end to the Fc lens drive section 33. The focus lens drive motor 34 is then driven in response to the drive signal, and the focus lens 14 is moved to the macro object-closer end. This is the end of the telemacro transition process.

Note here that, in step S29, if it is determined that the mode is not auto-focus, or the focus lens 14 is at the macro object-closer end, the telemacro transition process is ended.

Instep S22, if it is determined that a user command comes for interruption of mode transition to telemacro, the procedure goes to step S31. In step S31, the control section 26 executes the process of interrupting the mode transition to telemacro, and ends the telemacro transition process. Such a process of interrupting the mode transition to telemacro is described in detail by referring to the flowchart of FIG. 12.

In step S41, the control section 26 instructs the driver 29 to stop driving of the zoom lens 12. The control section 26 also calculates the shooting distance for the focus lens 14 for notification to the driver 29. This calculation is made based on the shooting distance of before mode transition stored in the memory 26-1 in the process of step S10, and the current position of the zoom lens 12. This calculation is so made that the lens position moves onto the curve L11, which is the locus of positions corresponding to combinations of the zoom lens position and the focus lens position of focus with the shooting distance of before transition. The driver 29 then determines the amount of travel based on the notified shooting distance for the focus lens 14.

In step S42, the control section 26 sets the operable range for the focus lens 14 from infinity to the normal object-closer end, and then makes a notification to the driver 29.

In step S43, the driver 29 outputs, to the Fc lens drive section 33, the drive signal corresponding to the determined amount of travel for the focus lens 14. In response to this drive signal, the focus lens drive motor 34 is driven so that the position of the focus lens 14 is moved. This is the end of the process of interrupting mode transition telemacro.

As described in the foregoing, the digital camera 1 applied with the present invention executes the lens control process. Accordingly, when mode transition is made from normal to telemacro in the auto-focus mode, the display section 18 displays no images with lens dust, or focused-in-optical-system images during the mode transition to telemacro. Moreover, the focus lens can be moved to the position corresponding to the shortest shooting distance in the telemacro shooting mode in a short time.

Even if mode transition to telemacro is interrupted, it becomes possible to reduce the time for focusing again. When the mode switching is made to manual focus during mode transition to telemacro, it becomes possible to reduce the time for manual focusing after mode transition is completed.

Note here that the lens control process is exemplified by the second background draw-in process. This is surely not restrictive, and alternatively, the first, third, or fourth background draw-in process may be executed.

It should be understood by those skilled in the art that various modifications, combinations, sub-combinations, and alterations may occur depending on design requirements and other factors insofar as they are within the scope of the appended claims or the equivalents thereof.

What is claimed is:

1. An image pickup device having an auto-focus feature of adjusting a focus lens to focus on a picked-up image of an object, a zoom feature of changing a focus distance, and a telemacro-mode shooting feature of obtaining generally-difficult close-range focus by fixing the focus distance to a telescope end, the image pickup device comprising:
   focus mode switching means for switching between an auto-focus mode in which the auto-focus feature is activated, and a manual mode in which the auto-focus feature is deactivated;
   shooting mode switching means for switching between a telemacro mode in which the telemacro shooting feature is activated, and a normal mode in which the telemacro shooting feature is deactivated;
   zoom lens drive means for driving a zoom lens to adjust the focus distance;
   focus lens drive means for driving the focus lens to adjust a shooting distance; and
   control means for exercising control over, when the normal mode is switched to the telemacro mode, the zoom lens drive unit to move a zoom lens position to a telescope end, and exercising control over the focus lens drive unit to move a focus lens position to an object-closest end in the telemacro mode.

2. The image pickup device according to claim 1, wherein the control means can move the zoom lens position to the telescope end in a positive direction being from a wide side to a telescope side for the zoom lens, and move the focus lens position with a monotonous increase to the object-closest end in the telemacro mode in another positive direction being from a far side to a close side for the focus lens.

3. The image pickup device according to claim 1, wherein the control means can move the zoom lens position to the telescope end, and move the focus lens position to the object-closest end in the telemacro mode to allow a combination point of the zoom lens position and the focus lens position to move along a locus that passes an object-closest end of achieving focus with the zoom lens at the wide end.

4. The image pickup device according to claim 1, wherein a position space containing a combination point of the zoom lens position and the focus lens position in the normal mode is divided into first and second ranges along a locus that passes an object-closest end of achieving focus with the zoom lens at the telescope end in the normal mode, and when the first range contains a combination point of an original zoom lens position and an original focus lens position, the control means can move the zoom lens position to the telescope end in a positive direction being from a wide side to a telescope side for the zoom lens by way of the highest point of the locus, and move the shooting distance for the focus lens with a monotonous increase to the object-closest end in the telemacro mode in another positive direction being from a far side to a close side for the focus lens, and when the second range contains the combination point of the original zoom lens position and the original focus lens position, the control means can move the combination point of the zoom lens position and the focus lens position to the object-closest end in the telemacro mode after moving the combination point onto the locus to be up to the highest point therealong.

5. The image pickup device according to claim 1, wherein a position space containing a combination point of the zoom lens position and the focus lens position in the normal mode is divided into first and second ranges along a locus that passes an object-closest end of achieving focus with the zoom lens at the telescope end in the normal mode, and when the first range contains a combination point of an original zoom lens position and an original focus lens position, the control means can move the zoom lens position to the telescope end in a positive direction being from a wide side to a telescope side for the zoom lens, and move the shooting distance for the focus lens with a monotonous increase to the object-closest end in the telemacro mode in another positive direction being from a far side to a close side for the focus lens, and when the second range contains the combination point of the original zoom lens position and the original focus lens position, the control means can move the zoom lens position to the telescope end in the positive direction by way of the highest point of the locus, and move the shooting distance for the focus lens with a monotonous increase to the object-closest end in the telemacro mode.

6. The image pickup device according to claim 1, wherein when the telemacro mode is switched to the normal mode during mode transition to telemacro, the control means can stop the zoom lens from moving, and make the focus lens focus with an original shooting distance of before the mode transition to telemacro.

7. The image pickup device according to claim 1, wherein when the auto-focus mode is switched to the manual focus mode during mode transition to telemacro, the control means can move the focus lens position to a position corresponding to the shooting distance of before the mode transition to telemacro.

8. An image pickup method for an image pickup device having an auto-focus feature of adjusting a focus lens to focus on a picked-up image of an object, a zoom feature of changing a focus distance, and a telemacro-mode shooting feature of obtaining generally-difficult close-range focus by fixing the focus distance to a telescope end, the image pickup device including:
   focus mode switching means for switching between an auto-focus mode in which the auto-focus feature is activated, and a manual mode in which the auto-focus feature is deactivated;
   shooting mode switching means for switching between a telemacro mode in which the telemacro shooting feature is activated, and a normal mode in which the telemacro shooting feature is deactivated;
   zoom lens drive means for driving a zoom lens to adjust the focus distance; and
   focus lens drive means for driving a focus lens to adjust a shooting distance; the image pickup method comprising
   a control step of moving the zoom lens position to the telescope end through control over the zoom lens drive means when the normal mode is switched to the telemacro mode, and moving the focus lens position to the object-closet end in the telemacro mode through control over the focus lens drive means.

9. A program embodied in a computer-readable medium for controlling an image pickup device having an auto-focus feature of adjusting a focus lens to focus on a picked-up image of an object, a zoom feature of changing a focus distance, and a telemacro-mode shooting feature of obtaining generally-difficult close-range focus by fixing the focus distance to a telescope end, the image pickup device including:
   focus mode switching means for switching between an auto-focus mode in which the auto-focus feature is activated, and a manual mode in which the auto-focus feature is deactivated;
   shooting mode switching means for switching between a telemacro mode in which the telemacro shooting feature is activated, and a normal mode in which the telemacro shooting feature is deactivated;
   zoom lens drive means for driving a zoom lens to adjust the focus distance; and
   focus lens drive means for driving a focus lens to adjust a shooting distance;
   the program being executable by a digital controller to control the zoom lens drive means to move the zoom lens position to the telescope end when the normal mode is switched to the telemacro mode, and to control the focus lens drive means to move the focus lens position to the object-closet end in the telemacro mode.

10. An image pickup device having an auto-focus feature of adjusting a focus lens to focus on a picked-up image of an object, a zoom feature of changing a focus distance, and a telemacro-mode shooting feature of obtaining generally-difficult close-range focus by fixing the focus distance to a telescope end, the image pickup device comprising:
   a device operable to switch between an auto-focus mode in which the auto-focus feature is activated, and a manual mode in which the auto-focus feature is deactivated;
   a device operable to switch between a telemacro mode in which the telemacro shooting feature is activated, and a normal mode in which the telemacro shooting feature is deactivated;
   a device operable to drive a zoom lens to adjust the focus distance;
   a device operable to drive the focus lens to adjust a shooting distance; and
   a device operable to exercise control over, when the normal mode is switched to the telemacro mode, the zoom lens drive unit to move a zoom lens position to a telescope end, and exercise control over the focus lens drive unit to move a focus lens position to an object-closest end in the telemacro mode.

* * * * *